(12) United States Patent
McDonald

(10) Patent No.: US 12,219,940 B2
(45) Date of Patent: *Feb. 11, 2025

(54) ANIMAL WATER DISPENSER APPARATUS

(71) Applicant: Tim McDonald, Missouri City, TX (US)

(72) Inventor: Tim McDonald, Missouri City, TX (US)

(*) Notice: Subject to any disclaimer, the term of this patent is extended or adjusted under 35 U.S.C. 154(b) by 603 days.

This patent is subject to a terminal disclaimer.

(21) Appl. No.: 17/545,533

(22) Filed: Dec. 8, 2021

(65) Prior Publication Data
US 2022/0167586 A1    Jun. 2, 2022

Related U.S. Application Data

(63) Continuation-in-part of application No. 16/658,846, filed on Oct. 21, 2019, now Pat. No. 11,744,227, which is a continuation-in-part of application No. 15/951,667, filed on Apr. 12, 2018, now Pat. No. 10,780,462, which is a continuation-in-part of application No. 15/409,058, filed on Jan. 18, 2017, now Pat. No. 11,089,789, which is a continuation-in-part of application No. 14/877,519, filed on Oct. 7, 2015, now Pat. No. 10,456,812, which is a continuation-in-part of application No. 14/812,545, filed on Jul. 29, 2015, now Pat. No. 9,408,412, which is a continuation-in-part of
(Continued)

(51) Int. Cl.
A01K 7/02    (2006.01)
B08B 9/093    (2006.01)

(52) U.S. Cl.
CPC .............. A01K 7/02 (2013.01); B08B 9/0933 (2013.01); B08B 2209/08 (2013.01)

(58) Field of Classification Search
CPC .......... A01K 7/02; A01K 7/00; A01K 45/002; A01K 39/02; A01K 7/027; B08B 9/0933; B08B 3/102; B08B 9/093; B08B 3/02; B08B 3/048; B08B 2209/08; B08B 9/0813; A22C 25/02; A22C 21/0061; A22C 17/08; B05B 1/04; B05B 13/0636; B05B 9/01; B05B 17/08
USPC ....................................................... 134/94.1
See application file for complete search history.

(56) References Cited

U.S. PATENT DOCUMENTS 3,586,294 A * 6/1971 Strong .................. B08B 9/0933
                                                      976/DIG. 383
4,248,176 A * 2/1981 Kilstofte .................. A01K 7/02
                                                      119/72
(Continued)

Primary Examiner — David G Cormier
Assistant Examiner — Thomas Bucci
(74) Attorney, Agent, or Firm — Egbert, McDaniel & Swartz, PLLC

(57) ABSTRACT

An animal water container has a container with an inlet opening and an outlet opening in which the inlet opening is positioned below the outlet opening, a water hose connected to the inlet opening and adapted to pass fresh water into an interior of the container, and a nozzle affixed to the inlet opening. The nozzle is positioned adjacent the bottom of the container. The nozzle is adapted to direct an unobstructed pressurized flow of water toward the bottom of the container so as to pressure wash, clean and remove debris from the interior of the container. The outlet opening is adapted to allow water from the interior of the container to be released outwardly of the container.

11 Claims, 4 Drawing Sheets

Related U.S. Application Data application No. 14/550,195, filed on Nov. 21, 2014, now Pat. No. 9,320,286.

(56) References Cited

U.S. PATENT DOCUMENTS

| | | | | |
|---|---|---|---|---|
| 4,309,962 A * | 1/1982 | Boozer | A01K 7/00 | 119/74 |
| 4,469,049 A * | 9/1984 | Waynick | A01K 7/06 | 119/76 |
| 4,630,569 A * | 12/1986 | Dieleman | A01K 45/002 | 119/69.5 |
| 4,924,812 A * | 5/1990 | Bernays, Jr. | A01K 7/06 | 119/76 |
| 5,052,343 A * | 10/1991 | Sushelnitski | A01K 7/02 | 119/74 |
| 10,986,811 B1 * | 4/2021 | McDonald | A01K 7/02 | |
| 11,744,227 B1 * | 9/2023 | McDonald | A22C 17/08 | 134/94.1 |
| 2002/0162513 A1 * | 11/2002 | Winney | A01K 7/00 | 119/78 |
| 2003/0075113 A1 * | 4/2003 | Desatoff | A01K 45/002 | 119/69.5 |
| 2007/0036528 A1 * | 2/2007 | Ferrone | F16L 53/38 | 392/480 |
| 2007/0056610 A1 * | 3/2007 | Lee | B08B 3/048 | 134/198 |
| 2008/0073451 A1 * | 3/2008 | Bradbury | B05B 1/04 | 239/599 |
| 2010/0175625 A1 * | 7/2010 | Klenotiz | A01K 7/06 | 119/74 |
| 2012/0018016 A1 * | 1/2012 | Gibson | A01K 45/002 | 137/561 R |
| 2012/0152374 A1 * | 6/2012 | Hymes | A01K 7/02 | 137/392 |
| 2014/0053782 A1 * | 2/2014 | Vaccaro, II | A01K 7/02 | 119/74 |
| 2014/0116345 A1 * | 5/2014 | Huber | A01K 45/002 | 119/69.5 |
| 2015/0192933 A1 * | 7/2015 | Hymes | G05D 9/12 | 137/386 |
| 2018/0177154 A1 * | 6/2018 | Etherton | A01K 7/02 | |

* cited by examiner

ANIMAL WATER DISPENSER APPARATUS

CROSS-REFERENCE TO RELATED APPLICATIONS

The present application is a continuation-in-part of U.S. patent application Ser. No. 16/658,846, filed on Oct. 21, 2019, and entitled "Animal Water Dispenser Apparatus and Process for Providing Fresh Water to an Animal", presently pending. U.S. patent application Ser. No. 16/658,846 is a continuation-in-part of U.S. patent application Ser. No. 15/951,667, filed on Apr. 12, 2018, and entitled "Washing Apparatus for Cleaning Game, Fruit, Vegetables, Fish or Crustacea in a Container", now issued as U.S. Pat. No. 10,780,462 on Sep. 22, 2020. U.S. patent application Ser. No. 15/951,667 is a continuation-in-part of U.S. patent application Ser. No. 15/409,058, filed on Jan. 18, 2017, and entitled "Apparatus for Cleaning Crustacea or Game", now issued as U.S. Pat. No. 11,089,789 on Aug. 17, 2021. U.S. patent Ser. No. 15/409,058 is a continuation-in-part of U.S. patent application Ser. No. 14/877,519, filed on Oct. 7, 2015, and entitled "Apparatus and Method for Washing Meat and/or Produce", now issued as U.S. Pat. No. 10,456,812 on Oct. 29, 2019. U.S. application Ser. No. 14/877,519 is a continuation-in-part of U.S. patent application Ser. No. 14/812,545, filed on Jul. 29, 2015, and entitled "Apparatus and Method for Cleaning Produce", now issued as U.S. Pat. No. 9,408,412 on Aug. 9, 2016. U.S. patent application Ser. No. 14/812,545 is a continuation-in-part of U.S. application Ser. No. 14/550,195, filed on Nov. 21, 2014, now issued as U.S. Pat. No. 9,320,286 on Apr. 26, 2016 and is entitled "Apparatus and Method for Cleaning Game".

BACKGROUND OF THE INVENTION

1. Field of the Invention

The present invention relates to the provision of water to animals and pets. More particularly, the present invention relates to water bowls is used for supplying water to animals and pets. In particular, the present invention relates to such water bowls that refresh the water and clean the water bowl.

2. Description of Related Art Including Information Disclosed Under 37 CFR 1.97 and 37 CFR 1.98

Today, many households frequently have one or more pets, usually dogs and/or cats. Other households have horses and other animals as pets. One of the problems frequently encountered by pet owners is that there is not always someone at home at the necessary times to attend to the basic needs of the family pet, such as providing water. The pet owner may be away during portions of the day working, at school or attending to other matters. Frequently, the pet owner can make arrangements for the pet to be cared for by a friend, neighbor or other family member that will look in on the pet. The watering schedule for many pets can usually be arranged to be at convenient times for both the owner and the pet.

Although pets can be fed at certain times during the day, the same is not true for the pet's fluid needs. During the hot summers and other times during the year, the pet may need to receive water or other fluids on an "as needed" basis in order to maintain the pet's health. As a result, many owners rely on pet water dishes to provide the pet with water throughout the day. Many pet water dishes are merely a bowl that is placed on the floor other convenient location to provide the pet with fluids. A bowl may not be sufficient for larger pets or during hot weather or when the owner is not going to be present for an extended period of time. In these circumstances, there is a need for a bowl with a larger reservoir water. While it is possible to provide a larger bowl for the pet, larger bowls can be problematic. For example, a larger bowl is more difficult to transport from the filling area to the pet's drinking location. The greater amount of water presents an increased risk of spilling the water while the bowl is being moved. When the larger bowl is filled with water, it can be very heavy and difficult to carry.

Another problem with the large quantities of water occurs where more water is present then the pet can conveniently drink over a reasonable period of time. In those instances, the water can become contaminated with debris, thus rendering it unpalatable or even unhealthy. Particles of food and other items have a tendency to be dropped into the water by the pet, This soils the water and creates a breeding ground for bacteria and contagion. Another problem that occurs is that if the pet's dish is in a location that will be heated by the sun. The pet may not want to drink warm water. In certain locations, insect larvae can collect on the surface of the water. This can cause an eventual insect infestation and potential stinging injuries to the pet.

In addition to domestic pets, other animals are supplied with water by bowls that remain usually in place for days, and must periodically be cleaned and replenished. These animal can include zoo animals, animals housed in kennels, and many farm animals. In general, larger animals require larger containers, sometimes shaped more like a deep trough. As such, a need has developed so as to be able to supply water to animals which keeps the water container free of debris and which continuously replenishes the water with cool and fresh water throughout a period of time.

In the past, various patents and patent application publications have issued with respect to animal watering systems. For example, U.S. Pat. No. 6,119,628, issued on Sep. 19, 2002 Lorenzana et al., teaches an animal water dispensing apparatus that includes a molded plastic base member which has a reservoir support portion and a water receiving recess connected to receive water from a reservoir. A stainless steel liner for the recess is formed with small apertures to allow water to flow into the liner.

U.S. Pat. No. 8,104,431, issued on Jan. 31, 2012 to K. Klenotiz, shows a self-filling and self-training watering device. This apparatus has a first compartment containing a bowl that accepts fluid from an inlet opening. The fluid is continuously drained from the bowl. A second compartment, proximate to the bowl, houses a reservoir which temporarily retains continuously drained fluid. A pump is actuated by a float switch to discharge water from the reservoir. A sensor detects a movement so as to trigger a flow of fluid into the bowl.

U.S. Pat. No. 8,117,991, issued on Feb. 21, 2012 to S. Civitillo, discloses a pet water dispenser having a system of water pumps to circulate water, a water bowl containing a temperature sensor to determine the temperature of the water in the bowl, an ultraviolet light and a filter to purify and clean the circulating water, an in the-line water heater, and a thermoelectric cooling plate to keep the water at a desired temperature. Water jets inside the bowl spray water against the inside of the bowl to clean hair and debris from the bowl. A rotating drain disk in the bowl periodically opens to permit emptying of old water from the water bowl and closes to permit filling of the bowl with fresh water. A digital controller permits a pet owner to control the operation of the dispenser and the temperature of the water present in the bowl.

U.S. Pat. No. 8,651,056, issued on Feb. 18, 2014 to Gass et al., shows a pet bowl water cooling system that includes a bowl, a pump for removing water from the bowl, a heat transfer device, and a conduit adapted to carry the water to the heat transfer device. The heat transfer device can include a metal coil submerged in a relatively cool liquid medium. The bowl includes a float valve to allow water to flow into the bowl when the float valve is activated. A liquid medium includes water in a water reservoir of an evaporative cooler.

U.S. Pat. No. 8,978,587, issued on Mar. 17, 2015 to E. A. Vaccaro, discloses an automatic freshening water dispenser that has a bottom and is defined by a side wall engaging the bottom and rising to a top edge. Three water inputs are positioned in the bowl. Two of the water inputs are positioned adjacent to the bottom of the bowl to eject water in a direction away from the recessed portion. A third water input is positioned in the side wall at a location in the bowl opposing the recessed portion in order to eject water in a direction toward the recessed portion. A conduit couples the first, second and third water inputs to a water source connection.

U.S. Pat. No. 10,264,762, issued on Apr. 23, 2019 to A. P. Lamb, discloses an automatic self-cleaning and self-filling outdoor fluid feeding system for an animal. The system includes a sink, a fluid transport system, a housing supporting the sink and containing the fluid transport system, and a control assembly configured to control the automatic self-cleaning and self-filling operations of the system.

U.S. Patent Application Publication No. 2006/0037547, published on Feb. 23, 2006 to Flowers et al., provides an animal water bowl assembly that is maintained clean by allowing the bowl to dry out after a use period. Two bowls are coordinated so that one is in use with water while the other is drying out. A two-faced assembly with oppositely facing bowls can automatically coordinate the steps for the two bowls. The water bowl assembly has at least two bowls. Filling with water occurs automatically by using water from a hydraulic source.

U.S. Patent Application Publication No. 2006/0236948, published on Oct. 26, 2006 to L. I. Wechsler, provides a self-replenishing pet water bowl. This pet water bowl includes a trough defining a bowl portion and a feed-containing reservoir engageable in communication therewith. The reservoir can be selectively sealable such that the feed contents can be retained in the reservoir when inverted. There is an opening in a lower position. When installed during active feeding, the reservoir can be selectively opened to allow for a release of the contents to the trough of the bowl for consumption by the pet.

U.S. Patent Application Publication No. 2009/0217881, published on Sep. 3, 2009 to M. Chambers, shows a pet water cooler which has a container or reservoir for holding a supply of water. The container is secured to a bowl or tray into which the reservoir will feed water. The reservoir usually has only a single opening or orifice for the water to be released into the bowl. This orifice is placed in the tray such that water flows out of the reservoir into the tray until an equilibrium is reached between the level of water in the tray and the remaining water in the reservoir. As the pet drinks water from the tray, additional water is released from the reservoir to refill the container until a new equilibrium is achieved. This continues until all of the water is removed from the reservoir and flows into the tray.

U.S. Patent Application Publication No. 20130213308, published on Aug. 22, 2013 to J. D. Koskey, provides a pet drinking bowl designed to keep water fresh. This pet drinking bowl has a first housing section containing a drinking bowl and a pump section. A second housing section covers the pump section. There is an inlet and an outlet between the bowl section and the pump section. A filter is adjacent to the inlet. A pump with an exit is connected to the outlet. The device also includes a gravity feed water reservoir that has a conduit into the pump section.

U.S. Pat. No. 8,251,300, issued on Aug. 28, 2012 to C. L. Wilson, teaches a peripheral dial sprinkler controller. The sprinkler controller includes a central portion and a peripheral switch that is movable in an arcuate path relative to the central portion. The peripheral switch may be a peripheral dial that can be rotated about the central portion. The dial is rotatable to select a particular mode of the sprinkler controller. A display screen is positioned on the central portion.

U.S. Patent Application Publication No. 2002/0162513, published on Nov. 7, 2002 to M. V. Winney, teaches an automatic water supply device and method therefor. This automatic water supply device comprises a water container, a pressure sensitive diaphragm refill valve, and a garden hose adapter. A pet is supplied automatically with fresh drinking water, as needed. The diaphragm is actuated when water falls below a certain level. This publication shows obstructions to the discharge of water into the container. As such, no cleaning action is provided.

U.S. Pat. No. 4,469,049, issued on Sep. 4, 1984 to J. L. Waynick, teaches an animal-activated watering device which is designed to maintain a high standard of sanitation. The device includes a reservoir for holding drinking water for the animal. The reservoir is drained after the animal's use. The reservoir is constructed of stainless steel or other smooth materials which allows the reservoir to completely drain. This prevents stagnant or contaminated water from being available for drinking by the animal.

The present inventor is the owner of U.S. Pat. No. 9,320,286, issued on Apr. 26, 2016. This patent describes an apparatus and method for cleaning game. In particular, this apparatus has a container with an interior volume defined by wall of the pipe position in the container adjacent to the wall. The pipe has at least one aperture suitable for directing a flow of water to a portion of the wall spaced from the pipe such of the flow of water creates a cyclonic path in the container. Ultimately, the pipe introduces water into the container such that as the water rises in the container, the water and associated debris in the water will reach the top of the container and spill thereover. As such, the pipe continuously provides clean water for the purposes of cleaning game. U.S. Pat. No. 9,408,412 shows a similar system adapted for the cleaning of produce.

The present inventor is also the inventor in U.S. Patent Application Publication No. 2019/0230945, published on Aug. 1, 2019. This patent describes an apparatus with multiple nozzles for the cleaning of crustacea or game. This apparatus has a container with an interior defined by wall, a fluid inlet extending into the interior volume of the container, and a plurality of nozzles connected to the fluid inlet. The fluid inlet is adapted to pass a fluid under pressure into the interior volume of the container. Ultimately, as water rises within the container, the water will overflow the top of the container or exit through an outlet of the container so as to discharge dirt, debris and other contaminants from the interior of the container. The outlet of the container is positioned above the inlet so that as water is introduced into the bottom of the container, the water and the floating debris, will rise so as to eventually exit the container.

After experience with the manufacture and sale of products associated with the above-identified patents and patent applications of the present inventor, it was found that the system can be adapted so as to provide continuous clean and fresh water to pets. The system is also adaptable for continuously cleaning the container.

It is an object of the present invention to provide an animal water dispenser apparatus which continuously provides clean and fresh water to an animal.

It is another object of the present invention to provide an animal water dispenser apparatus that pressure washes, cleans and removes dirt and debris from the interior of the container.

It is another object of the present invention to provide an animal water dispenser apparatus that provides a unlimited supply of water to the animal.

It is still another object of the present invention to provide an animal water dispenser apparatus which is easy-to-use, easy to manufacture and relatively inexpensive.

It is still another object of the present invention to provide an animal water dispenser apparatus which automatically removes insect larvae from the surface of the water and thereby prevents insect infestations.

It is still a further object of the present invention to provide an animal water dispensing apparatus which is difficult for the animal to overturn.

These and other objects and advantages of the present invention will become apparent from a reading of the attached specification and appended claims.

BRIEF SUMMARY OF THE INVENTION

The present invention is an animal water container that comprises a container having an inlet opening and an outlet opening in which the inlet opening is positioned below the outlet opening, a water hose connected to the inlet opening, and a nozzle affixed to the inlet opening. The water hose is adapted to pass fresh water into an interior of the container. The outlet opening is adapted to allow water from the interior of the container to be released outwardly of the container. The nozzle is positioned adjacent to the bottom of the container. The nozzle is adapted to direct an unobstructed pressurized flow of water toward the bottom of the container so as to pressure wash, clean and remove debris from the interior of the container.

In the present invention, the nozzle has a reduced diameter discharge port. This "reduced diameter" means that the area of the discharge port is less than the area of the inlet opening. As such, any water flowing through the inlet opening will be pressurized when passing through the reduced-diameter discharge port. In the preferred embodiment of the present invention, this discharge port has a stadium shape. The "stadium shape" is defined as having a pair of straight parallel sides with curved or semicircular ends. This stadium shape has an upper side and a lower side. The lower side extends generally parallel to the bottom of the container. The discharge port, in the preferred embodiment, is positioned in the interior of the container. Alternatively, this discharge port can be formed in a wall of the container. The nozzle passes the flow of water at approximately four gallons per minute into the interior of the container. The flow of water from the water hose is delivered directly into the nozzle and outwardly through the discharge port.

The animal water dispenser of the present invention further includes a fresh water source connected to the water hose. This fresh water source is adapted to pass the fresh water under pressure through the water hose. In particular, the fresh water source can be a faucet. The water hose is either connected or interconnected to the faucet. The inlet opening has a portion extending outwardly of an exterior of the container. The portion of the inlet opening has a connection for the water hose at an outer end thereof.

The container can be a bucket or a trough. When the container is a bucket, the bucket can have a handle mounted at or adjacent to a top thereof. The handle is movable between an extended position and a retracted position. The outlet opening has a portion extending outwardly of the container and located at or adjacent to a top of the container. A drain hose can be connected to the portion of the outlet opening. This drain hose is adapted to pass water from the container toward a desired drain area.

This foregoing Section is intended to describe, with particularity, the preferred embodiments of the present invention. It is understood that modifications to the preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
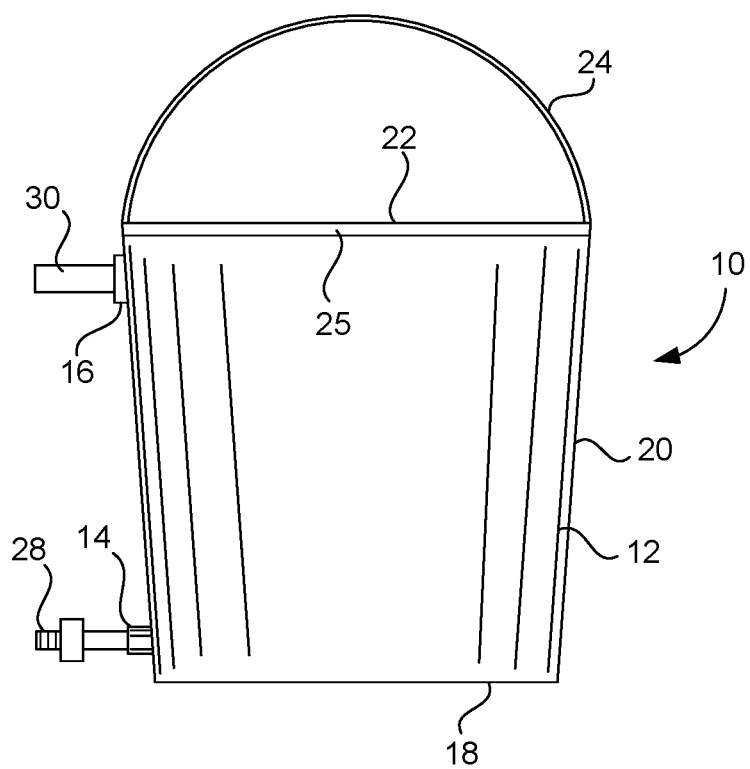
FIG. 1 is a side elevational view showing the animal water dispenser apparatus in accordance with the present invention.

Referring to FIG. 1, the animal water dispenser apparatus 10 is illustrated. The animal water dispenser apparatus 10 has a container 12 with an inlet opening 14 and an outlet opening 16. The inlet opening 14 is positioned below the outlet opening 16.

The container 12 is in the nature of a water bucket. The container 12 has a bottom 18 and a wall 20. The wall 20 tapers upwardly and outwardly from the bottom 18 so as to have an open top 22. There is a lip 25 that extends outwardly and downwardly from the top 22 of the container 12. The container 12 can be made of a polymeric material.

A handle 24 is pivotally mounted at the top 22 of the container 12. In FIG. 1, the handle 24 is illustrated as in an extended position.

Figure 5:
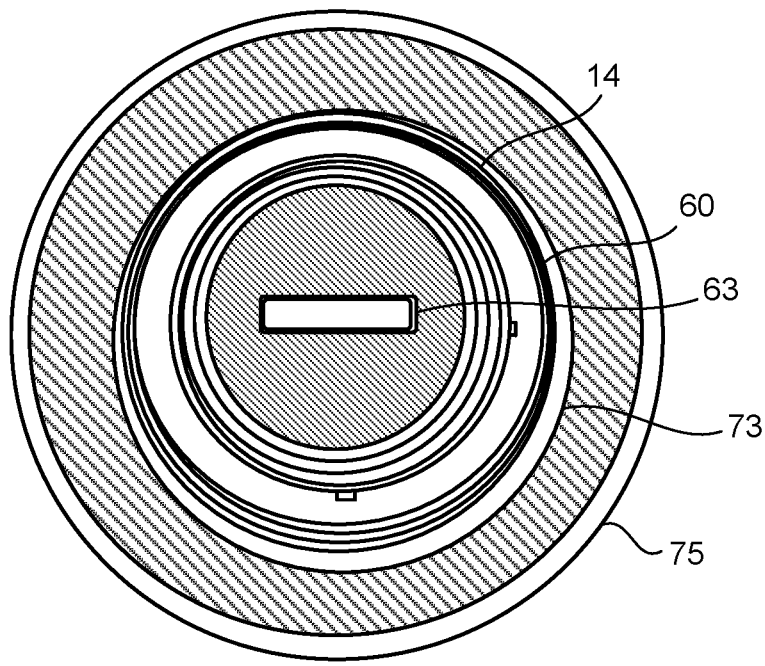
FIG. 5 is an opposite end view of the nozzle and inlet opening of the present invention.

The container 12 will contain a relatively large amount of water, such as a five gallon bucket. In other embodiments, the container can be in the nature of a trough (as shown in FIG. 5). The container 12 can be of any material. In particular, the bucket can be of a polymeric material or can be of a metallic and/or stainless steel material. In the circumstances where the container is in the nature of a trough, the trough can be formed of a concrete material or a metallic material.

When an animal desires to receive water from the container 12, the animal can simply reach over the top 22 of the container 12 in order to drink water. The container 12 is particularly useful in association with large pets, such as large dogs and horses. However, other animals will find it relatively easy to reach over the top 22 in order to receive water from the interior of the container 12.

The handle 24 can make the container 12 virtually spill-proof. Handle 24 can be draped over a fence post so as to fix the position of the container 12. In other circumstances, the handle 24 can be draped over another object so as to fix the position of the container 12.

The container 12 is continuously refreshed with clean and cool water. As such, the inlet opening 14 is configured so as to introduce water into the interior of the container 12. The inlet opening 14 has a portion that extends outwardly of an exterior of the container 12. This portion has a connection 28 suitable for connection to a water hose. As such, the water hose can be joined to the connection 28 so as to deliver water, under pressure, into the interior of the container. The inlet opening 14 can include a nozzle positioned within the interior of the container. The nozzle is connected to the inlet opening in order to deliver water from the inlet opening into the interior of the container so as to pressure wash, clean and remove debris from the interior of the container. As will be described in connections with FIGS. 3-6, the nozzle can have a reduced diameter discharge port. This discharge port can have a stadium shape. The stadium shape is defined as a pair of parallel straight sides with semicircular or curved ends joining the parallel sides. This configuration directs water from the water hose toward the bottom of the container and toward the side walls of the container so as to pressure wash, clean and remove dirt, debris and algae from the bottom of the container and from the sides of the container. The nozzle is configured so as deliver water in a bottom-to-top-toward bottom circular pattern. Ultimately, the circular pattern will discharge the water, along with the dirt, debris and algae, outwardly of the outlet opening 16. This type of nozzle emits a fan-style spray of water in a direction toward the side walls of the container 12 away from the inlet opening 14.

Eventually, as water fills the container, it will reach a level to that of the outlet opening 16. The outlet opening 16 has a portion 30 that extends outwardly of the exterior of the container 12. As such, when water reaches the level of the outlet opening 16, water will flow outwardly of the container through portion 30. Ultimately, portion 30 can be connected to a drain hose so as to allow water from the interior of the container 12 to be drained to a remote location away from the container 12. The outlet opening 16 can also be the top of the container 12. As such, as water reaches the top of the container 12, water and debris will flow outwardly over the lip 25 of the upper edge of the container. Water will spill toward areas exterior of and adjacent to the container. In other circumstances, a drain pan can be placed below the container so as to collect any water and debris which is flowed over the upper edge of the container.

The configuration of the present invention allows the animal water dispenser apparatus to be self-cleaning. The high-pressure release of water through the nozzle at the inlet opening 14 provides a strong force in which dirt, debris and algae are forced off of the bottom and sides of the container. The intermittent introduction of the water through the inlet opening will keep the water fresh. The fan of water from the nozzle pressure washes the bottom of the container. This bottom-to-top-toward bottom circular flow pattern enhances the discharge of water and debris through the outlet opening 16. It also serves to keep the debris in suspension. Since the nozzle limits the discharge of water to approximately four gallons per minute, the present invention unexpectedly conserves water. If an actual garden hose were used, the discharge rate of water from the garden hose would be approximately twelve gallons per minute. The restriction of water through the nozzle serves to prevent an excessive amount of water from being used. As such, the present invention quite effectively utilizes the water that is available in an efficient and effective manner.

Figure 2:
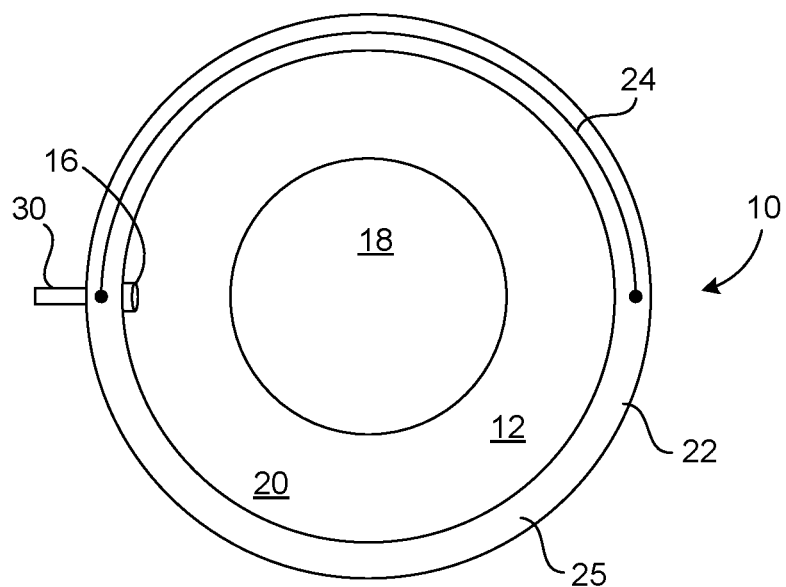
FIG. 2 is a plan view of the animal water dispenser apparatus of the present invention.

FIG. 2 shows the top of the animal water dispenser apparatus 10 of the present invention. As can be seen, the container 12 has a bottom 18, a wall 20 and a top 22. Handle 24 is pivotally mounted to the top 22. FIG. 2 shows the handle 24 in its retracted position. The inlet opening 14 is located adjacent to the bottom 18 of the container 12. The outlet opening 16 is located adjacent to the top of the container 12. The outlet opening 16 is shown as having portion 30 extending outwardly of the exterior of the container 12.

The handle 24 can be moved to the retracted position overlying the lip 25 of container 12. This allows easier access by animals to the water on the inside of the container 12. It will be appreciated that the present invention avoids potential spillage. Initially, the container 12 can be transported to a desired location by using the handle 24 in its extended position. Once the container 12 reaches its intended destination, the handle 24 can be lowered. It is not necessary to carry water from the water source to a remote location (thus creating potential spillage). After the empty container 12 reaches its intended destination, a water source can be actuated so that water will flow through the inlet opening 14 and fill the container 12. It is not necessary to move the container to any other location, unless desired. Also, it will be appreciated that the container 12 has a relatively light weight not filled with water. As such, even children can move the container to a desired location since the container is not filled with water when initially deployed. The container only becomes have a once water is introduced into the interior of the container. The now-heavy weight of the container (when filled with water) will provide stability to the container throughout water consumption by the animal. In the present invention, the interior of the container 12 is always filled with water, consumption of the water by the animal will not reduce the weight of the filled container such that the filled container always provides stability when the animal drinks the water.

Figure 3:
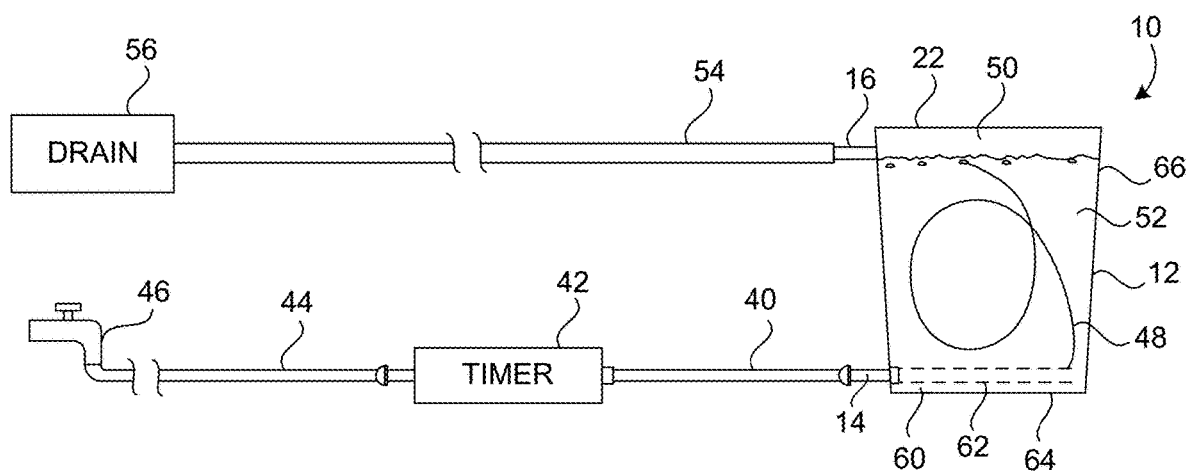
FIG. 3 is a diagrammatic illustration of the process of the present invention in which debris is removed from the bottom and side walls of the container and discharged out of the outlet opening of the container.

FIG. 3 shows the animal water dispenser apparatus 10 as used in a water system. Initially, it can be seen that the water inlet 14 is connected to one end of a first hose 40. An opposite end of the first hose 40 is connected to a timer 42. A second hose 44 is connected to a water source 46. The timer 42 is in the nature of a conventional sprinkler timer. The timer can be set to times when water will flow from the water source 46 through the second hose 44, through the first hose 40 and into the interior 48 of the container 12. The timer 42 can set the time of activation and the duration of activation. As such, if it is believed that is necessary to provide cool fresh water to a pet six times a day, then the timer can be set so as to allow water to flow six evenly spaced periods of time apart during the day. The timer can also be set so as to assure that water will flow for a desired period of time (such as three minutes). This will assure that the interior 48 of the container 12 is suitably filled with water such that the top level 50 of the water 52 in the interior 48 of container 12 reaches the outlet opening 16. Since water is continuously discharge through the outlet opening 16, the duration of water flow does not need to be accurately set. If the duration is over an extended period of time, the water will simply flow out of the outlet opening so that the container 12 is continuously filled with water.

As can be seen in FIG. 3, the water source 46 is in the nature of a faucet. An end of the second hose 44 is attached to the faucet 46 so that water flows, under pressure, through the second hose 44 and toward the timer 42. When the timer 42 is off, water is prevented from flowing into the first hose 40. When the timer 42 is on, the water will flow under pressure through the second hose 44, through the first hose 40 and into the inlet opening 14 of the container 12. Eventually, water will continue to flow until the level 50 of the water 52 reaches the outlet opening 16. At that time, water 52 will be discharged through the outlet opening 16.

FIG. 3 shows that there is a nozzle 60 affixed to the inlet opening 14. Nozzle 60 is in the nature of a reduced-diameter discharge port at an end opposite the inlet opening 14. Lines 62 illustrate the pattern of the flow of water released through the nozzle 16 into the interior of the container. As can be seen, the water (as evidenced by lines 62) is initially directed toward the bottom 64 of the container 12. After the water encounters the bottom and the side wall 66 of the container 12, it will flow upwardly in a bottom-to-top-toward bottom flow pattern. This circular flow pattern (as shown by lines 62 in FIG. 3) serves to keep any particles, dirt and debris in suspension in the water. Ultimately, the circular flow pattern urges such particles, dirt and debris outwardly through the outlet opening 16. In the meantime, the strong flow of water, in this pattern, serves to pressure wash, clean and remove particles from the bottom 64 and side wall 66 of the container 12. This effectively cleans the interior of the container 12. Any debris within the interior 48 of container 12 will generally float in the water. As such, the dirt and debris will be at the top level of the water 52. The dirt and debris is discharged, along with the water, through the outlet opening 16. As such, even though the animal causes dirt and debris to enter the container, this debris is continuously flushed. The animal will only be presented with clean and fresh water. The container 12 will remain generally dirt free.

In certain areas of the country, insect and mosquito larvae will be deposited by insects onto the surface of the water within the container 12. In the past, the animal would be consuming this larvae and can be possibly poisoned by the consumption of such larvae. In other circumstances, in conventional water containers and bowls, the larvae will eventually hatch into insects. The particular insects that may hatch from the larvae on the water will occupy a space adjacent to the container. There is potential for stinging injuries to the pet or animal by virtue of the proximity of the insects. It has been found that certain mosquitoes can be potentially lethal to animals and pets. It is important to avoid the accumulation of larvae and the associated hatched insects in proximity to the container. By virtue of the continuous flushing provided by the present invention, any larvae that is deposited onto the surface of the water within the container will eventually flow through the outlet opening 16 and away from the container. Ultimately, if a drain hose is connected to the outlet opening, the potentially dangerous larvae can be delivered to a remote location for disposal.

The outlet opening 16 is located generally adjacent to the top 22 of container 12. The outlet opening 16 is shown as to located directly above the inlet opening 14. However, the outlet opening 16 can be located in another location around the outer diameter of the container 12. The outlet opening 16 can be slightly greater than the inlet opening 14 so that dirt, debris, larvae and other objects that float on the surface of the water 52 can be discharged outwardly of the container 12. A drain hose 54 is connected to the outlet opening 16. Drain hose 54 can be extended to any drain location 56, such as a sewer system or drain field. If desired, the drain location 56 can be an area of the earth away from the container 12. In other circumstances, if desired, the drain location 56 can be a creek, a pond, or other body of water. In still other circumstances, if a sink is located near the container 12, the drain hose 54 can be extended so that the discharged water from the interior of the container 12 will pass into the drain of the sink. The previous embodiments, the container was in the nature of a bucket. Importantly, within the present invention, the container can be of various other configurations.

Figure 4:
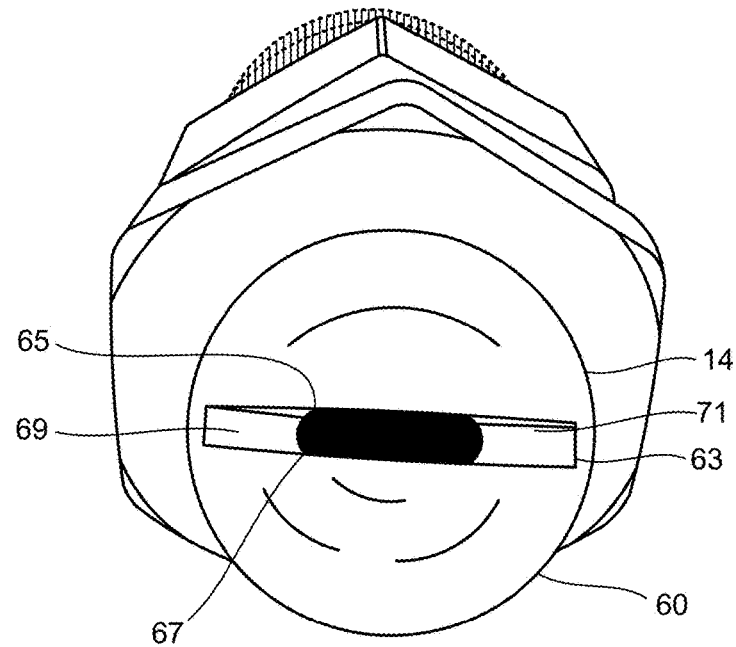
FIG. 4 is an end view showing the discharge port of the nozzle as positioned within the interior of the container of the present invention.

FIG. 4 shows, in particular, the nozzle 60 that is formed at the end of the fluid inlet 14. The nozzle 60 has a slot 63 having a generally stadium shape. This "stadium shape" has a pair of parallel straight sides 65 and 67 with straight or curved ends 69 and 71 connecting the straight sides 65 and 67. Nozzle 60 will be positioned in the interior of the container. The bottom side 67 will extend parallel to the bottom 64 of the container 12. The length dimensions of the sides 65 and 67 are substantially greater than the length dimensions of the ends 69 and 71. The nozzle 60 is adapted to direct a pressurized flow of water adjacent to the bottom 64 of the container 12. The end of the nozzle 60 can be suitably curved such that the discharge port 63 is also curved so as to be formed on the contour of the curved end of the nozzle 60.

FIG. 5 shows an exterior view of the fluid inlet 14 and in particular, the nozzle 60 that is formed at the end of the inlet opening 14. A hose connection 73 will be located exterior of the wall 75 of the container 12. The inlet opening 73 will have threads that will engage with the threads at the end of the water hose (in the manner described herein previously). FIG. 5 shows that the nozzle 60 has a reduced diameter discharge port 63. This "reduced diameter" discharge port means that the total area of the opening of the discharge port 63 will be less than the area of the end of the water hose (received in the threaded connection 63) or the inner diameter of the inlet opening 60. As such, the discharge port 63 will emit a strong pressurized flow of water therethrough.

Experiments with this configuration of nozzle have shown that it creates a strong laminar flow of water in a straight direction adjacent to the bottom 64 of the container 12. The stadium shape of the nozzle 60 creates a strong flow that tends to spread slightly upwardly from the bottom 64 of the container 12. As such, these flows of water tend interact with the dirt and debris so as to pressure wash, clean and forcibly remove the dirt and debris from the surfaces of the container 12. This configuration of slot also creates the bottom-to-top-toward bottom flow pattern of water within the interior 52 of the container 12.

Figure 6:
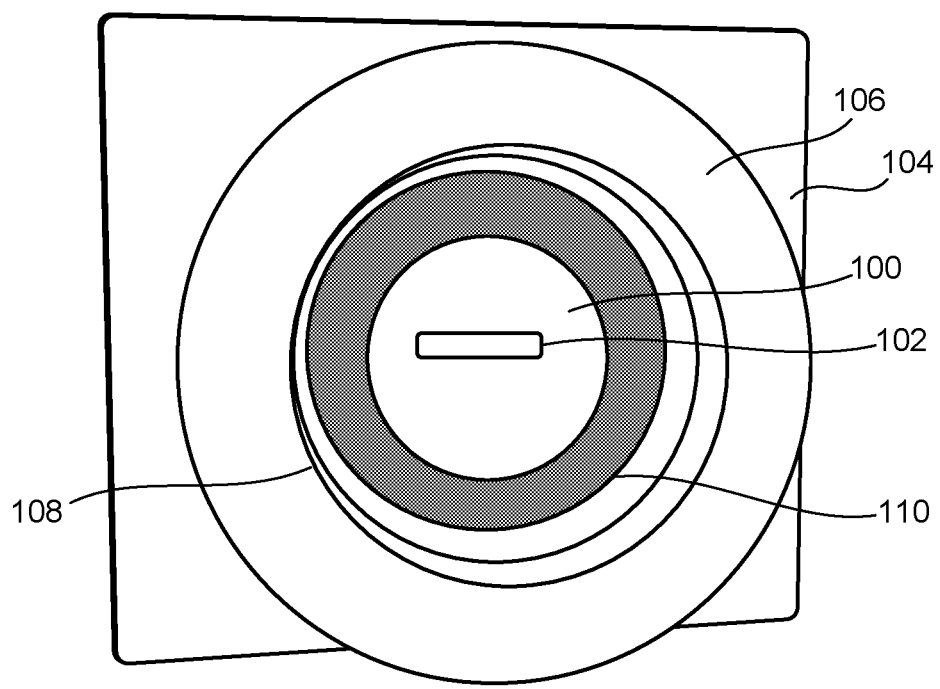
FIG. 6 is an end view as taken from the exterior of the container of an alternative embodiment of the nozzle and discharge port of the present invention.

FIG. 6 shows an alternative embodiment of the nozzle 100. Nozzle 100 is actually a slot 102 that is formed in the wall 104 of the container. As such, the slot 102 is not located in the interior of the container but simply on the wall of the container. The inlet opening 106 will have a molded threaded connection 108 that is adapted to receive the threaded connection of a water hose therein. A gasket 110 establishes a liquid-tight seal between the garden hose and the interior of the inlet opening 106.

As with the previous embodiment, shown in FIGS. 4 and 5, the slot 102 has a stadium shape. Since this slot 102 is actually formed directly on the wall 104 of the container, this reduces the number of items that are required for the assembly and construction of the present invention and, as such, reduces the cost of the present invention. It is believed that this configuration of the nozzle 100 will have the same effect as the nozzle positioned directly within the interior of the container. Furthermore, by forming the slot 102 in the wall 104 of the container, there are no obstructions in the interior of the container that could impede or otherwise interfere with a desired flow pattern of water on the interior of the container.

Figure 7:
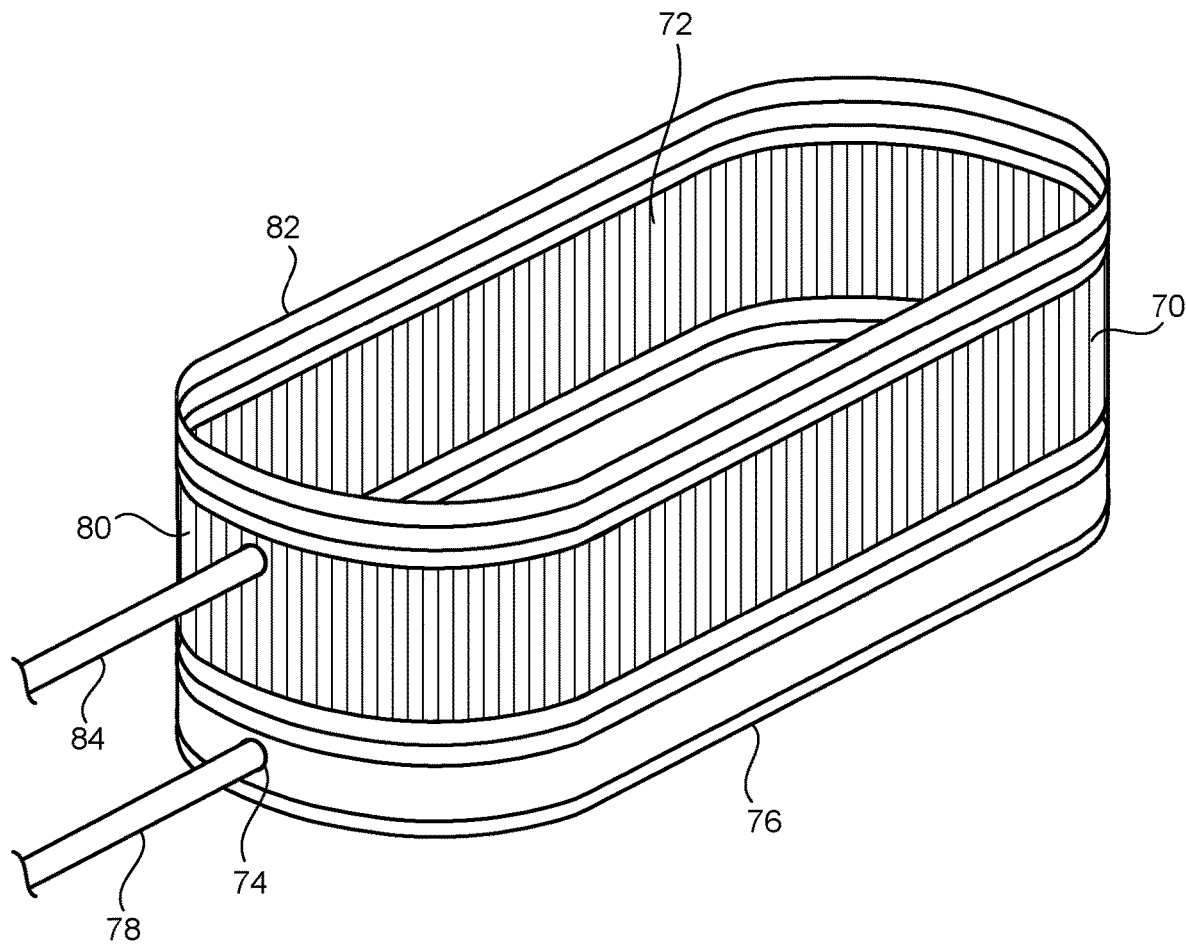
FIG. 7 is an upper perspective view showing the animal water dispenser apparatus of the present invention as used in conjunction with a trough.

FIG. 7 shows an embodiment in which the container is trough 70. This trough 70 can be in the nature of troughs that supply water to horses, pigs, sheep, goats and other farm animals. The trough 70 will have an interior 72 that can can contain a relatively large amount of water. FIG. 5 shows that there is an inlet opening 74 positioned above and adjacent to the bottom 76 of the trough 70. A water hose 78 is connected to the inlet opening so as to supply fresh water into the interior 72 of the trough 70. The outlet opening 80 is positioned below and adjacent to the top 82 of the trough 70. Outlet opening 80 has a hose fitting connected thereto so that water from the interior 72 will eventually flow outwardly from the trough 70 through the hose 84. As such, the present invention is adapted so as to allow farm animals to be supplied with clean, fresh and cold water which is relatively contaminant free.

In the present invention, the pet or other animal is continuously supplied with fresh water. As such, during hot temperatures, the animal will know that fresh, clean end cool water will be provided at the location of the container 12. The animal will not be discouraged from drinking the water because of the hot temperature of the water. Additionally, potential illness to the animal be avoided because of the uncleanliness of the water. The present invention utilizes the hydrostatic qualities of water so as to pressure wash, clean and remove the dirt and debris from the container. The present invention avoids possible spillage because of the filling of the container after the container is placed in its desired location.

The foregoing disclosure and description of the invention is illustrative and explanatory thereof. Various changes in the details of the illustrated construction or the steps of the described method can be made within the scope of the appended claims without departing from the true spirit of the invention. The present invention should only be limited by the following claims and their legal equivalents.

I claim:

1. An animal water container comprising:
   a container having an inlet opening and an outlet opening, the inlet opening positioned below the outlet opening;
   a water hose connected to the inlet opening, said water hose being adapted to pass fresh water into an interior of said container, the outlet opening adapted to allow water from the interior of said container to be released outwardly of said container; and
   a nozzle affixed to the inlet opening, said nozzle positioned adjacent a bottom of said container, said nozzle adapted to direct an unobstructed pressurized flow of water toward the bottom of said container so as to pressure wash, clean and remove debris from the interior of said container, said nozzle having a reduced diameter discharge port adapted to pressurize the flow of water from the inlet opening, the reduced diameter discharge port having a stadium shape with an upper side and a lower side in parallel relation to each other, the lower side extending generally parallel to the bottom of said container, the flow of water being in a bottom-to-top-toward bottom circular pattern.

2. The animal water container of claim 1, the reduced diameter discharge port positioned in the interior of said container.

3. The animal water container of claim 1, said nozzle passing the flow of water at approximately four gallons per minute.

4. The animal water container of claim 1, further comprising:
   a fresh water source connected to said water hose, said fresh water source adapted to pass fresh water under pressure through said water hose.

5. The animal water container of claim 4, said fresh water source comprising a faucet, said water hose being connected or interconnected to said faucet.

6. The animal water container of claim 1, said inlet opening having a portion extending outwardly of an exterior of said container, the portion of the inlet opening having a connection for said water hose at an outer end thereof.

7. The animal water container of claim 1, said container being a bucket or a trough.

8. The animal water container of claim 7, said container being a bucket, the bucket having a handle mounted at or adjacent to a top thereof, the handle being movable between an extended position and a retracted position.

9. The animal water container of claim 1, the outlet opening having a portion extending outwardly of said container and located at or adjacent to a top of said container, the animal water container further comprising:
   a drain hose connected to the portion of the outlet opening, said drain hose adapted to pass the water from said container toward a desired drain area.

10. An animal water dispenser comprising:
    a container having an inlet opening and an outlet opening, the inlet opening positioned below the outlet opening, the inlet opening having a portion extending outwardly of an exterior of said container, the portion of the inlet opening having a connection for a water hose formed exterior of said container; and
    a nozzle affixed to the inlet opening, said nozzle positioned adjacent a bottom of said container, said nozzle adapted to direct an unobstructed pressurized flow of water toward the bottom of said container so as to pressure wash, clean and remove debris from the interior of said container, said nozzle having a reduced diameter discharge port adapted to pressurize the flow of water from the inlet opening, the reduced diameter discharge port having a stadium shape, the stadium shape having an upper side and a lower side in parallel relation to each other, the lower side extending generally parallel to the bottom of said container, the pressurized flow of water being in a bottom-to-top-toward bottom circular pattern.

11. The animal water dispenser of claim 10, the reduced diameter discharge port positioned interior of said container.

* * * * *